(12) United States Patent
Oliver et al.

(10) Patent No.: US 11,246,304 B2
(45) Date of Patent: Feb. 15, 2022

(54) AIR BOOM DISTRIBUTION SYSTEM

(71) Applicant: Deere & Company, Moline, IL (US)

(72) Inventors: Matthew R. Oliver, Van Meter, IA (US); David A. Hanson, Urbandale, IA (US)

(73) Assignee: DEERE & COMPANY, Moline, IL (US)

( * ) Notice: Subject to any disclaimer, the term of this patent is extended or adjusted under 35 U.S.C. 154(b) by 281 days.

(21) Appl. No.: 16/294,233

(22) Filed: Mar. 6, 2019

(65) Prior Publication Data

US 2020/0037599 A1 Feb. 6, 2020

Related U.S. Application Data

(60) Provisional application No. 62/712,747, filed on Jul. 31, 2018.

(51) Int. Cl.
*A01M 9/00* (2006.01)
*A01C 15/04* (2006.01)
*A01C 21/00* (2006.01)

(52) U.S. Cl.
CPC ............. *A01M 9/003* (2013.01); *A01C 15/04* (2013.01); *A01C 21/005* (2013.01); *A01M 9/0092* (2013.01)

(58) Field of Classification Search
CPC ....... A01C 15/04; A01C 15/18; A01C 21/005; A01M 9/003; A01M 9/0092
USPC ...................... 239/67–69, 654, 655, 672–680
See application file for complete search history.

(56) References Cited

U.S. PATENT DOCUMENTS

| 4,523,280 A | * | 6/1985 | Bachman | ............... | A01C 15/00 222/613 |
| 4,767,062 A | | 8/1988 | Fletcher | | |
| 5,024,356 A | * | 6/1991 | Gerling | .................. | A01C 15/04 222/312 |
| 5,052,627 A | | 10/1991 | Balmer | | |

(Continued)

FOREIGN PATENT DOCUMENTS

CN 103619159 A 3/2014

OTHER PUBLICATIONS

European Search Report issued in counterpart European Patent Application No. 19184896.9 dated Jan. 14, 2020 (5 pages).

*Primary Examiner* — Cody J Lieuwen
(74) *Attorney, Agent, or Firm* — Taft Stettinius & Hollister LLP; Stephen F. Rost

(57) ABSTRACT

A method of inhibiting dry material clogs in a work vehicle having an air boom assembly includes moving the work vehicle at a vehicle speed along a ground surface, moving dry material from a holding tank onto a conveyor, and operating the conveyor at a conveyor speed, the conveyor speed being at least partially dependent upon the vehicle speed, moving material from the conveyor into a boom assembly with a blower, dispensing the dry material onto the ground surface through a plurality of nozzles of the boom assembly, and comparing the conveyor speed to a maximum acceptable conveyor speed. If the conveyor speed is greater than the maximum acceptable conveyor speed, the method includes performing at least one of the following: alerting the operator that the conveyor speed is greater than the maximum acceptable speed, and reducing the vehicle speed to thereby reduce the speed of the conveyor.

18 Claims, 6 Drawing Sheets

(56) References Cited

U.S. PATENT DOCUMENTS

| | | | | |
|---|---|---|---|---|
| 5,125,583 A * | 6/1992 | Strand | ............... | A01M 9/003 |
| | | | | 239/655 |
| 5,485,962 A * | 1/1996 | Moss | ............... | A01C 15/04 |
| | | | | 239/655 |
| 6,131,818 A * | 10/2000 | White | ............... | A01C 3/066 |
| | | | | 239/654 |
| 8,078,367 B2 * | 12/2011 | Sauder | ............... | G06Q 40/12 |
| | | | | 701/50 |
| 9,664,249 B2 * | 5/2017 | Kowalchuk | ............... | F16F 15/02 |
| 2002/0112671 A1 | 8/2002 | Patterson et al. | | |
| 2015/0166269 A1 | 6/2015 | Roberge et al. | | |
| 2017/0313255 A1 | 11/2017 | Brett et al. | | |

* cited by examiner

AIR BOOM DISTRIBUTION SYSTEM

CROSS-REFERENCE TO RELATED APPLICATIONS

The present application claims priority to U.S. Provisional Application No. 62/712,747 filed Jul. 31, 2018, the entire contents of which are herein incorporated by reference.

BACKGROUND

The present disclosure relates to dry nutrient applicators with air booms.

SUMMARY

Figure 1:
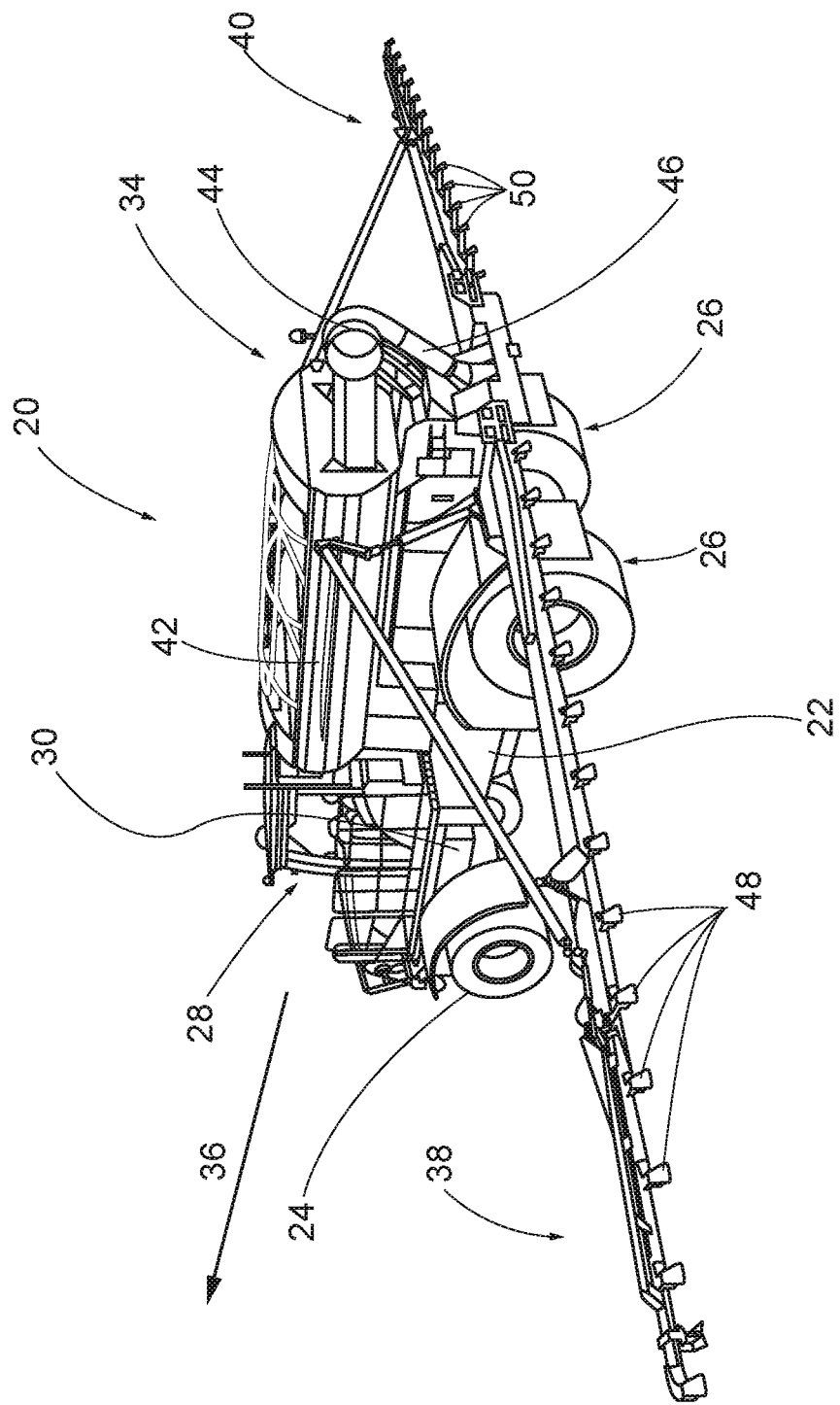

In some embodiments, the disclosure provides a work vehicle including a frame, a drive train connected to the frame, an operator station supported by the frame, and a ground engaging device connected to the frame. A holding tank is connected to the frame to store dry material. A conveyor move the dry material from the holding tank. A boom assembly transports the dry material, nozzles are connected to the boom assembly to direct the dry material onto a ground surface. A blower blows the dry material from the conveyor into the boom assembly and out of the nozzles. A user interface includes a display. A control system senses a speed of movement of the conveyor and compares the speed of movement of the conveyor to a maximum acceptable speed. The control system also perform one of the following actions in response to sensing that the speed of movement of the conveyor is greater than the maximum acceptable speed: alerting an operator via the user interface to reduce a travel speed of the work vehicle, and reducing the travel speed of the work vehicle.

In some embodiments, the disclosure provides a control system for a work vehicle that has a frame, a drive train connected to the frame, an operator station supported by the frame, a ground engaging device connected to the frame, a holding tank connected to the frame to store dry material, a conveyor that moves the dry material from the holding tank, a boom assembly that transports the dry material, nozzles connected to the boom assembly to direct the dry material onto a ground surface, a blower that blows the dry material from the conveyor into the boom assembly and out of the nozzles, and a user interface that includes a display. The control system includes a sensor that senses a travel speed of the work vehicle, and a processor that calculates a speed of movement of the conveyor based upon the sensed travel speed of the work vehicle and compares the calculated speed of movement of the conveyor to a maximum acceptable speed. When the calculated speed of movement of the conveyor is greater than the maximum acceptable speed, the processor performs one of the following actions: alerts the user to reduce the travel speed of the work vehicle, and communicates with the drive train to thereby reduce the travel speed of the work vehicle.

In some embodiments, the disclosure provides a method of inhibiting dry material clogs in a work vehicle having an air boom assembly. The method includes moving the work vehicle at a vehicle speed along a ground surface, moving dry material from a holding tank onto a conveyor, and operating the conveyor at a conveyor speed, the conveyor speed being at least partially dependent upon the vehicle speed. The method further includes moving material from the conveyor into a boom assembly with a blower, dispensing the dry material onto the ground surface through a plurality of nozzles of the boom assembly, and comparing the conveyor speed to a maximum acceptable conveyor speed. If the conveyor speed is greater than the maximum acceptable conveyor speed, the method includes performing at least one of the following: alerting the operator that the conveyor speed is greater than the maximum acceptable speed, and reducing the vehicle speed to thereby reduce the speed of the conveyor.

Other aspects of the disclosure will become apparent by consideration of the detailed description and accompanying drawings.

BRIEF DESCRIPTION OF THE DRAWINGS

FIG. 1 is a rear perspective view of a work vehicle and an application system.

FIG. 2 is a side view of a portion of the application system with the air boom in a stowed position.

FIG. 3 is a close up perspective view of a rear of the application system with parts removed for clarity.

FIG. 4 is a cross-sectional view of the taken along line 4-4 of FIG. 2.

FIG. 5 is a schematic view of a processor.

FIG. 6 is a flow chart showing a method of operation according to some embodiments.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

FIG. 1 illustrates an example agricultural dry nutrient applicator 20 according to one embodiment. The illustrated dry nutrient applicator 20 is self-propelled and has a frame 22 that is supported by one or more front ground-engaging devices 24 (e.g., wheels, tracks) and a pair of rear ground-engaging devices 26 (e.g., wheels, tracks). Alternatively, the agricultural dry nutrient applicator 20 may be a pull-behind type machine (not shown) with no front ground-engaging devices. An operator station 28 is mounted to the frame 22 at a forward end of the machine. A drive train 30 is configured to move the agricultural dry nutrient applicator 20 along a ground surface via the front ground-engaging devices 24. In some applications, an air seeder is utilized in place of the illustrated dry nutrient applicator 20

An application system 34 is also mounted to the frame 22 and positioned rearward of the operator station 28 in a direction opposite of a direction of forward travel 36. The application system 34 has a first boom arm 38 and a second boom arm 40, one or more material holding tanks 42 for holding dry material, a blower 44 and a conduit 46. The first boom arm 38 extends outward from one side of the applicator 20 (left of the operator station 28) and includes a plurality of outlets 48. The second boom arm 40 extends outward from the other side of the applicator 20 (right of the operator station 28) and includes a plurality of outlets 50. The holding tanks 42 are configured to retain one or more types of dry material for distribution onto a ground surface. The blower 44 is configured to move the dry material from the holding tanks 42 and into the first boom arm 38 and the second boom arm 40 and subsequently out of the plurality of outlets 48 and 50 onto a ground surface. While each illustrated boom arm 38 and 40 includes sixteen outlets, only some of the outlets are labeled in FIG. 1. Two outlets from each boom arm 38 and 40 are positioned behind a tailgate of the applicator 20. In some embodiments, the outlets are evenly spaced along the boom arms 38 and 40. Other configurations and quantities of outlets are possible.

Figure 2:
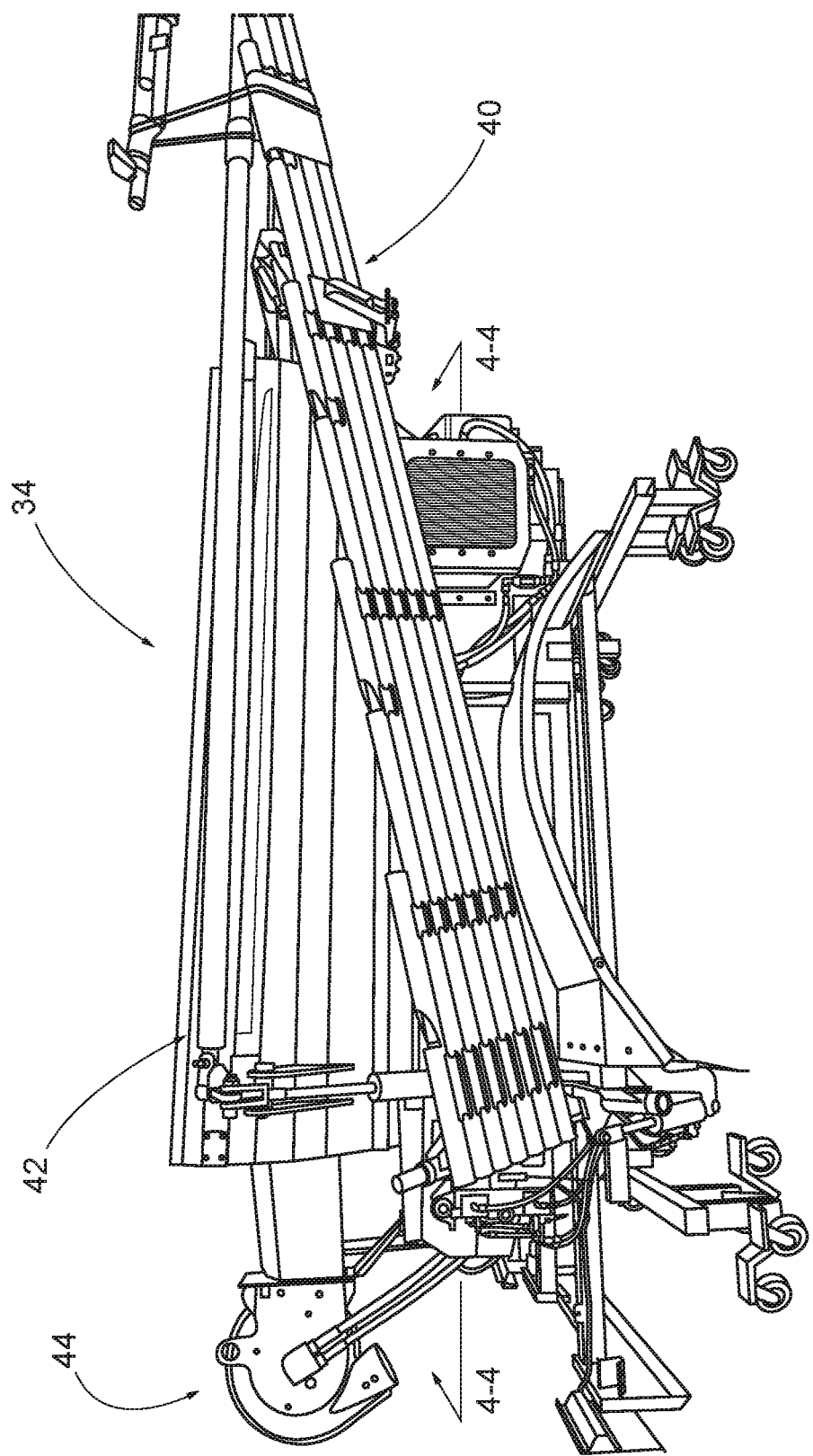

FIG. 2 illustrates the second boom arm 40 in a stowed position. The first boom arm 38 is substantially a mirror-image of the second boom arm 40 in both the deployed and stowed positions. The application system 34 is illustrated detached from the operator station 28 and the ground engaging devices 24, 26. The blower 44 is configured to move dry material from the tanks 42, through the conduit 46 (see FIG. 1) and toward the first and second boom arms 38 and 40.

Figure 3:
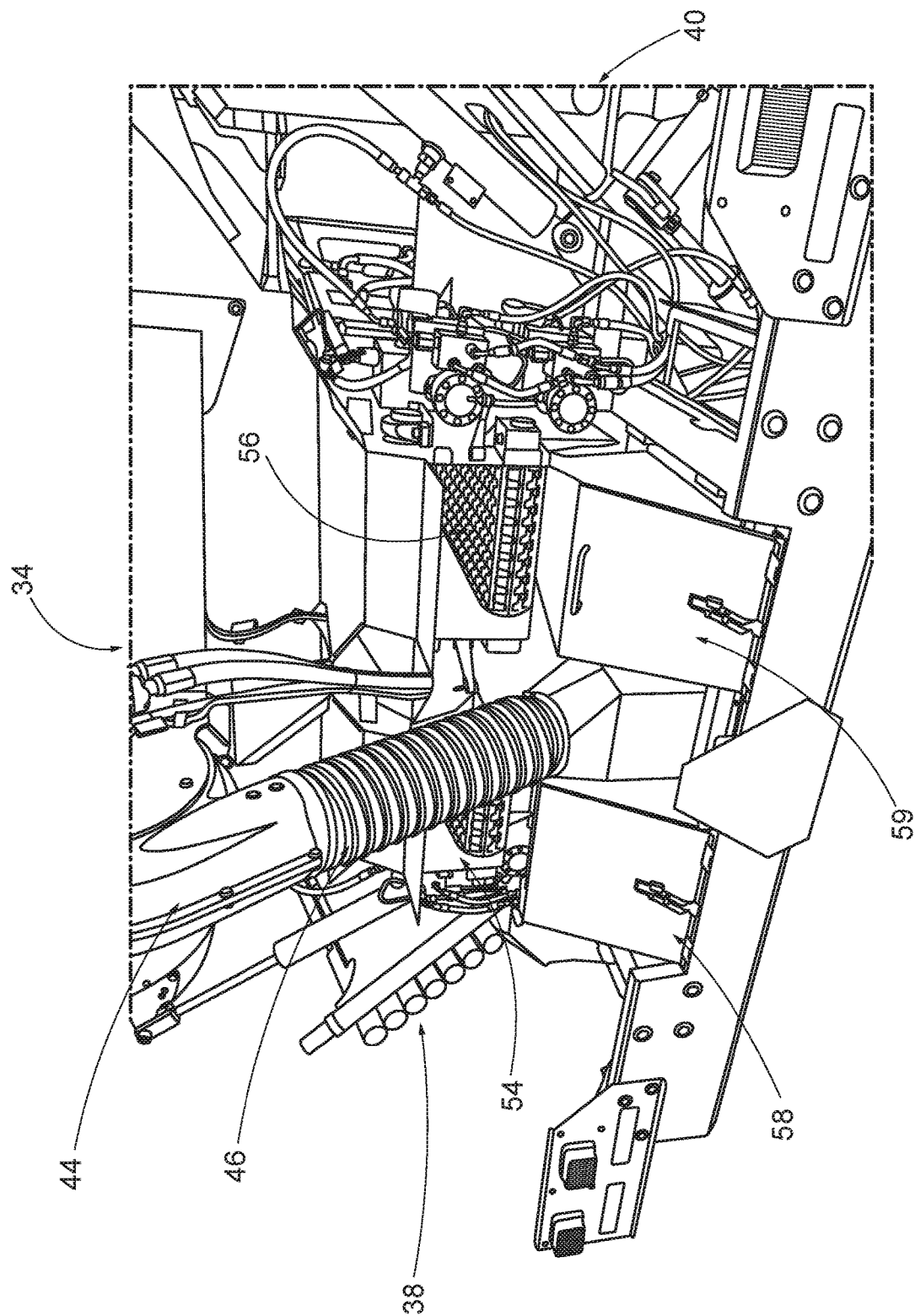

FIG. 3 illustrates a portion of the application system 34 with parts removed for clarity. The illustrated portion of the application system 34 includes the first boom arm 38 in a stowed position, the blower 44, the conduit 46, a first conveyor 54 and a second conveyor 56. The first conveyor 54 is configured to move dry material from one of the holding tanks 42 and into a first dry material reservoir 58. The blower 44 draws dry material from the first dry material reservoir 58 and directs the dry material toward the first boom arm 38. In some embodiments, the blower 44 also directs dry material from the first dry material reservoir 58 toward the second boom arm 40. A cover is typically positioned at a rear end of the first conveyor 54 to direct the dry material into the first dry material reservoir 58. The cover is removed for clarity.

The second conveyor 56 is configured to move dry material from another one of the holding tanks 42 into a second dry material reservoir 59. The blower 44 draws dry material from the second dry material reservoir 59 and directs the dry material toward the second boom arm 40. In some embodiments, the blower 44 also directs dry material from the second dry material reservoir toward the first boom arm 38. A cover is typically positioned at a rear end of the second conveyor 56 to direct the dry material into the second dry material reservoir 59. The cover is removed for clarity.

In some embodiments, the first conveyor 54 and the second conveyor 56 transport the same dry material. In other embodiments, the first conveyor 54 and the second conveyor 56 transport different dry materials. In some embodiments, the dry material from the first conveyor 54 and the dry material from the second conveyor 56 can mix in one or both of the first and second dry material reservoirs 58 and 59 prior to being directed into the respective boom arm 38 and 40.

Figure 4:
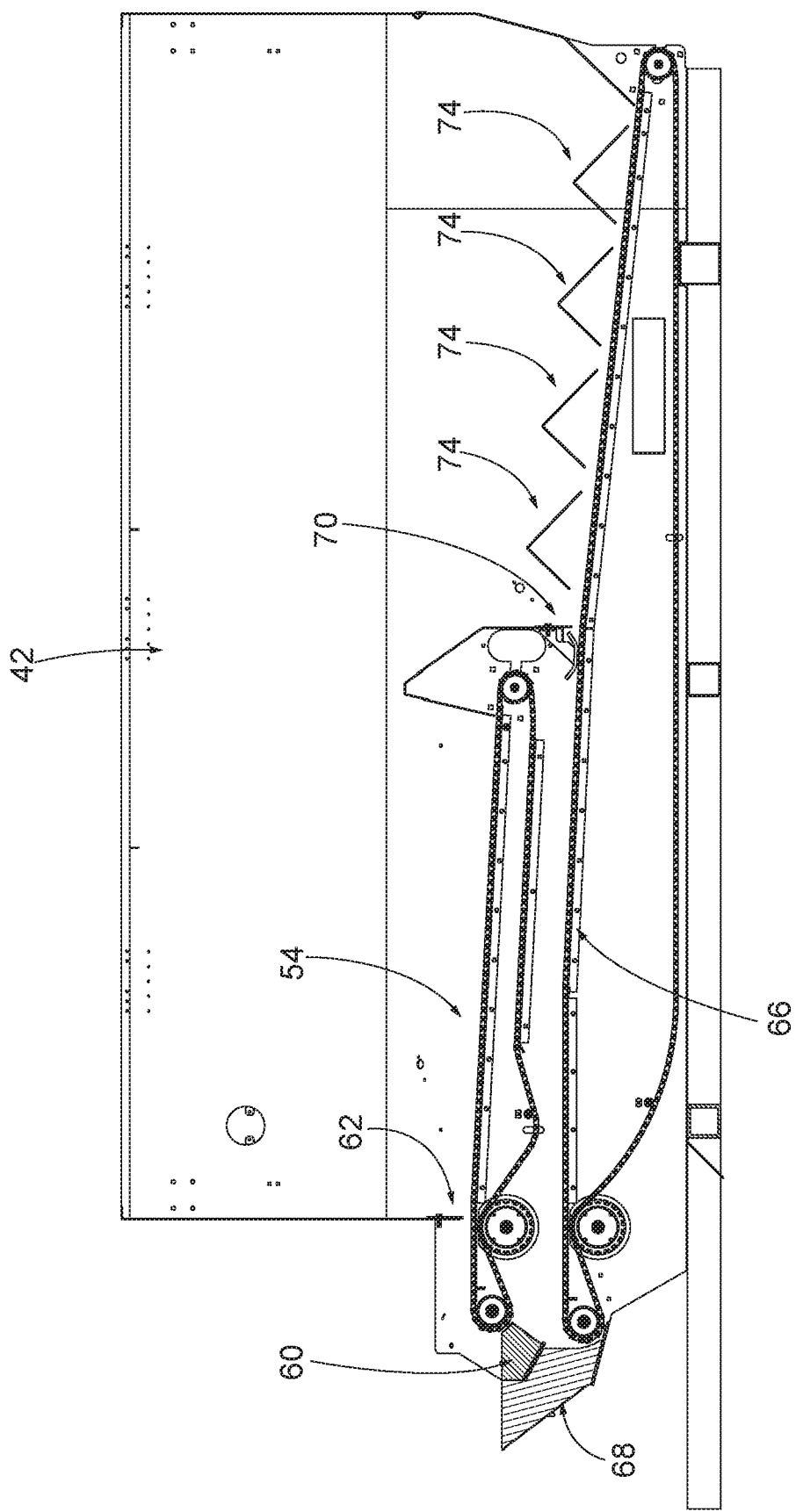

FIG. 4 illustrates the first conveyor 54 and one of the holding tanks 42. A first chute 60 is positioned to receive dry material from the first conveyor 54 and to direct the dry material into the first dry material reservoir 58 (see FIG. 3). A first gate 62 is positioned above the first conveyor 54 to inhibit large materials from passing through to the first chute 60. The first gate 62 can be moved relative to the first conveyor 54 based upon the specific material being dispensed. The first conveyor 54 is configured to move about rollers in a counter-clockwise direction to move dry material from the holding tanks 42 to the first chute 60. The second conveyor 56 can be substantially identical to the first conveyor 54.

FIG. 4 further illustrates a third conveyor 66 positioned below the first conveyor 54. A third chute 68 is positioned to receive dry material from the third conveyor 66. A third gate 70 is positioned above the third conveyor 66 to inhibit large materials from passing through to the third chute 68. The third gate 70 can be moved relative to the third conveyor 66 based upon the specific material being dispensed. The third conveyor 66 is configured to move about rollers in a counter-clockwise direction to move dry material from the holding tanks 42 to the third chute 68. A plurality of funnels 74 are positioned upstream of the third gate 70 to distribute dry materials on the third conveyor 66 somewhat evenly along a length of the third conveyor 66. A fourth conveyor is substantially identical to the third conveyor 66 and is positioned below the second conveyor 56. In some embodiments, the first and second conveyors 54 and 56 direct a first material into the dry material reservoir 58 and the third and fourth conveyors 66 direct a second material into the dry material reservoir 58.

The illustrated conveyors 54, 56 and 66 are volumetric devices, but the fertilizer rate prescribed and controlled by the system for users is sometimes given in mass per unit area. The control system often does not display volume to the user; instead the calibration value produced is given in cubic feet per revolution (CFR). The user is responsible to manually check the material being dispensed and/or spread for density. The density of material inversely affects the maximum capacity by volume, which may not be intuitive to the end user. The distribution system, either by entrained airflow or by a rotating spinner unit has capacity limitations that are not necessarily clear to the user while spreading material. The illustrated dry nutrient applicator 20 utilizes an algorithm that provides the user visual feedback on the display regarding the volume flow rate. In some embodiments, this algorithm controls the vehicle speed and/or the spread rate of dry material to remain below the functional limit of the volumetric flow assembly. In some embodiments, the algorithm alerts the operator to slow the dry nutrient applicator 20 down.

When users drive the dry nutrient applicator 20 at high speeds, the speed of the conveyors 54, 56 and 66 increase accordingly. At certain higher speeds, some dry materials do not spread evenly or adequately. Sometimes, the gates 62 and 70 and/or the boom arms 38 and 40 can clog if the dry material density does not permit the dry material to be spread evenly at the volumetric flow rate provided by the conveyors 54, 56 and 66. The algorithm can provide visual feedback to the user indicating the operation of the machine relative to the acceptable limit with one or more gauges or on a screen. If a user selects an automatic mode, the speed of the dry nutrient applicator 20 can be automatically controlled. Specifically, the acceptable conveyor operating speed limit will limit maximum vehicle speed when conveyor rate exceeds volumetric limit. The acceptable conveyor operating limit can be determined by a look up table or by a non-variable rate fertilizer spreading based upon the type of fertilizer being used.

Figure 5:
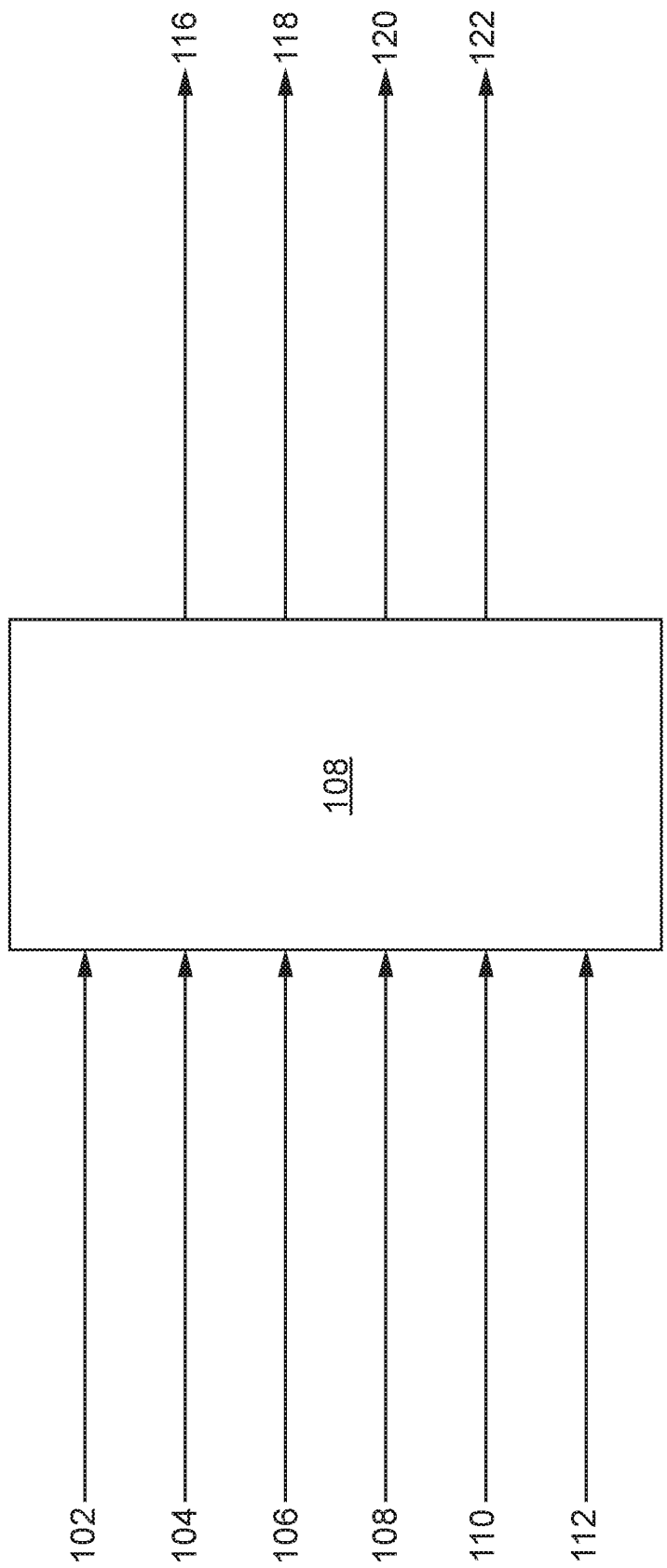

FIG. 5 illustrates features of the algorithm utilized to conveyor operating speed of the applicator 20 and/or the speed of the conveyors 54, 56 and 66. A processor 100 receives several inputs and generates outputs accordingly. A first input 102 is the volumetric flow limit for the specific material being dispensed which can be obtained from a look up table in a controller. A second input 104 is the current calculated volumetric flow as determined by one or more sensors and calculated by the controller. A third input 106 is a warning status binary input indicating if the operator has activated or de-activated the warning signal. A fourth input 108 is a speed adjustment status binary input indicating if the operator has activated or de-activated the automatic adjustment of the speed of the applicator 20. A fifth input 110 is the application rate status binary input indicating if the application rate is fixed or variable. A sixth input 112 is the variable rate look ahead time indicating the speed the applicator 20 should operate at a pre-determined distance ahead of the present position of the applicator 20.

The processor 100 receives and processes these inputs and generates outputs accordingly. A first output 116 generated by the processor 100 is a maximum acceptable vehicle speed. A second output 118 generated by the processor 100 is a maximum acceptable conveyor belt speed. A third output 120 generated by the processor 100 is the present travel speed of the vehicle as a percentage of the maximum acceptable vehicle speed. The fourth output 122 generated by the processor 100 is the present speed of the conveyor belt as a percentage of the maximum acceptable conveyor belt speed. In some embodiments, the outputs 120 and 122 are displayed to an operator on a user interface.

Figure 6:
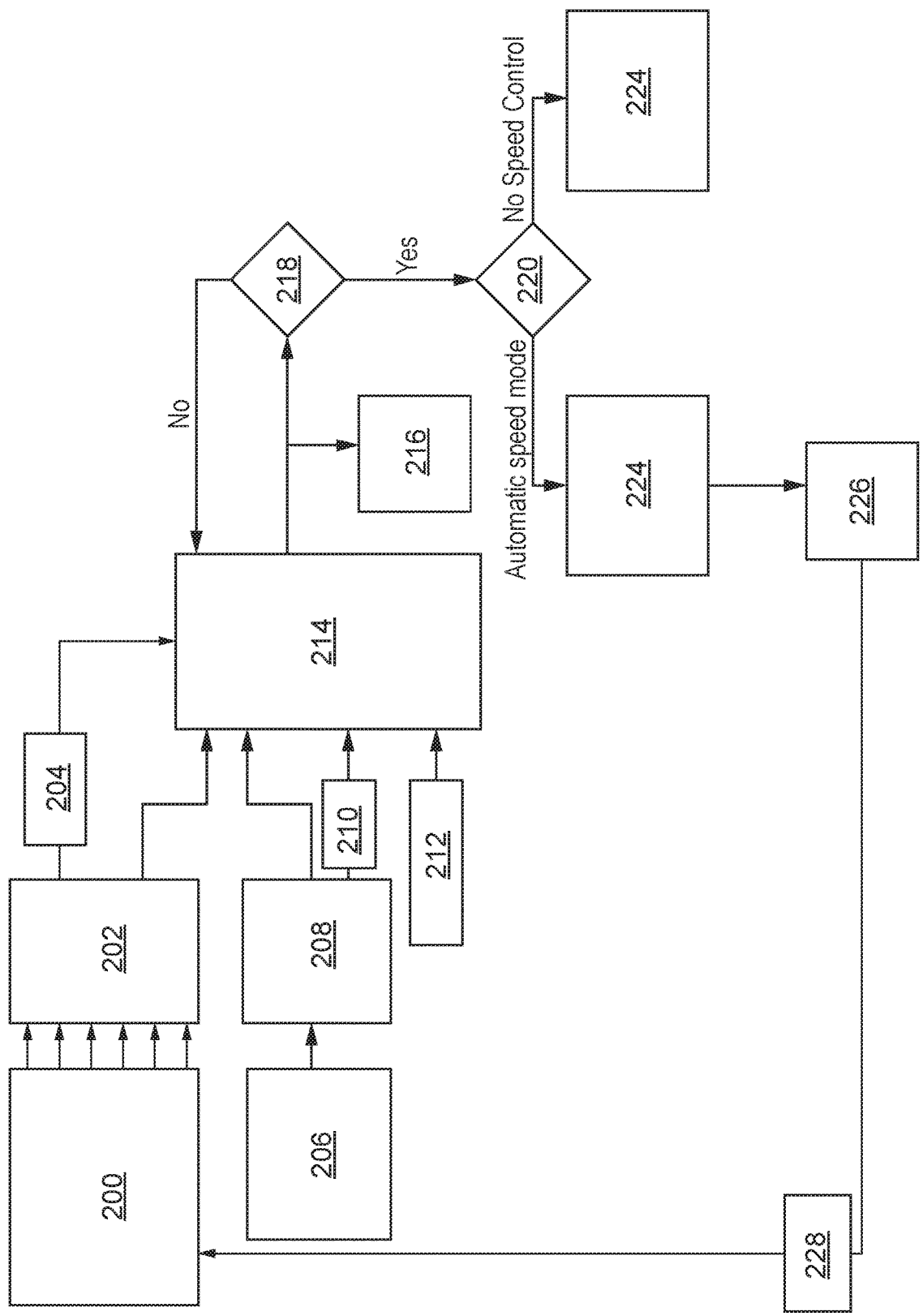

FIG. 6 illustrates a flow chart of operations according to some embodiments. At step 200, several data points are collected by the processor 100 for a first one of the tanks 42. In some embodiments, the data points collected include one or more of the following: dry material cubic flow rate, gate height, dry material distribution target rate (mass/area), dry material density, dry material spread width, measured vehicle speed, and future dry material distribution target rate. The data points are collected by one or more sensors or can be set by an operator. The dry material cubic flow rate is measured by one or more sensors. The gate height, the dry material distribution target rate (mass/area), the dry material density, and the dry material spread width are set by the operator.

The vehicle speed is measured by one or more sensors that detect a GPS (global positioning system) speed reading and/or by a wheel speed reading. The future dry material distribution target rate can be determined by the processor 100 based upon a map of the area to be traveled by the dry nutrient applicator 20 and the current travel speed of the dry nutrient applicator 20. The processor 100 can adjust the travel speed of the dry nutrient applicator 20 based upon the desired future speed of the dry nutrient applicator 20. In some embodiments, the processor 100 has a grid-like map of the field and the processor 100 is configured to look ahead at the portion of the field that will be traveled by the applicator 20 and adjust the speed of the applicator 20 accordingly. In some embodiments, the processor 100 consults the grid-like map of the field every ten to twenty seconds to adjust the travel speed of the applicator 20 accordingly.

At step 202, the processer calculates the desired operating rate of the first one of the tanks 42 (i.e., of a first material being dispensed from one of the tanks 42) based upon the collected data points. The processor operates a first belt (such as conveyor 54) at the desired belt operating speed in revolutions per minute at step 204.

At step 206, several data points are collected by the processor for a second one of the tanks 42. In some embodiments, the data points collected include one or more of the following: dry material cubic flow rate, gate height, dry material distribution target rate (mass/area), dry material density, dry material spread width, measured vehicle speed, and future dry material distribution target rate. The data points are collected by one or more sensors or can be set by an operator as described in detail with respect to step 200.

At step 208, the processor calculated the desired operating rate of the second one of the tanks 42 (i.e., of a second material being dispensed from the second one of the tanks 42) based upon the collected data points. The processor operates a second belt (such as conveyor 56) at the desired belt operating speed in revolutions per minute at step 210. In embodiments that utilize more than two tanks with dry material, the data points can be collected and the desired operating rate of each of the tanks can be calculated.

At step 212, the volumetric flow limit is communicated to the processor. The volumetric flow limit can be set in the factory or can be determined by a variety of operating conditions, such as the type of dry material being utilized, and the level of moisture in the dry material. The dry nutrient applicator 20 can sense the temperature and humidity as these values can affect the acceptable conveyor operating speed limit.

At step 214, the total volumetric flow of the dry material is calculated as a percentage of a maximum acceptable volumetric flow based upon the operating speeds of the first and second belts (and any other belts in use) is calculated by the processor 100. At step 216, the calculated percentage of maximum volumetric flow is displayed to the operator.

At step 218, the processor determines if the calculated percentage of maximum volumetric flow is greater than 95%. If the calculated percentage of maximum volumetric flow is not greater than 95%, operation returns to step 214. If the calculated percentage of volumetric flow is greater than 95%, operation moves to step 220.

At step 220, the processor determines if the dry nutrient applicator 20 is in automatic mode or manual mode. The operator selects either automatic mode or manual mode when beginning operation of the applicator 20. In some embodiments, the operator can change between automatic mode and manual mode during operation of the applicator 20. If the dry nutrient applicator 20 is in manual mode, operation moves to step 222. At step 222, the operator is warned to reduce the travel speed of the dry nutrient applicator 20. The warning can include an audio component, a visual component or both an audio component and a visual component. The audio component can include an alarm and/or audible instructions to reduce the vehicle speed. The visual indicator can include a message on the display and/or a light within the operator station.

In some embodiments, a first indicator indicates that the speed of movement of the conveyor is less than the maximum acceptable speed, a second indicator indicates that the speed of movement of the conveyor is approaching the maximum acceptable speed, and a third indicator indicates that the speed of movement of the conveyor is at or above the maximum acceptable speed. In some embodiments, the first indicator is a green light, the second indicator is a yellow light and the third indicator is a red light. In some embodiments, the visual component is a numerical display on a user interface indicating the current percentage of the maximum acceptable speed. The numerical display can change color or flash as the current percentage of the maximum acceptable speed approaches ninety-five percent.

If the dry nutrient applicator 20 is in the automatic mode, operation moves to step 224. At step 224, the processor sends the updated maximum vehicle speed to the vehicle speed control logic to replace the maximum vehicle speed from first output 116. The maximum vehicle speed may never exceed the maximum speed set by the operator. At step 226, the processor instructs the dry material applicator 20 to reduce the travel speed. At step 228, the reduced speed of travel of the dry nutrient applicator 20 is communicated to the processor to replace the previous speed collected in step 200.

Thus, the disclosure provides, among other things, an improvement to dry material applicators with air booms.

What is claimed is:

1. A control system for a work vehicle having a frame, a drive train connected to the frame and a conveyor configured to move dry material from a holding tank, the control system comprising:
   a sensor configured to sense a travel speed of the work vehicle; and
   a processor configured to
      calculate a speed of movement of the conveyor based upon the sensed travel speed of the work vehicle, and
      compare the calculated speed of movement of the conveyor to a maximum acceptable speed, the maximum acceptable speed based at least in part upon a volumetric flow limit of the dry material, where the volumetric flow limit is set in a factory or determined by the processor as a function of a level of moisture in the dry material;
   wherein the processor is further configured to, in response to the calculated speed of movement of the conveyor being greater than the maximum acceptable speed, perform one of the following actions: alert the operator to reduce the travel speed of the work vehicle, and communicate with the drive train to reduce the travel speed of the work vehicle.

2. A work vehicle comprising:
   a frame;
   a drive train connected to the frame;
   an operator station supported by the frame;
   a holding tank connected to the frame, the holding tank configured to store dry material;
   a conveyor configured to move the dry material from the holding tank;
   a boom assembly configured to transport the dry material;
   a plurality of nozzles connected to the boom assembly and configured to direct the dry material onto a ground surface;
   a blower configured to blow the dry material from the conveyor into the boom assembly and out of the plurality of nozzles;
   a user interface including a display; and
   the control system of claim 1.

3. The work vehicle of claim 2, wherein alerting the operator to reduce the travel speed of the work vehicle includes displaying a visual indicator that includes at least one the following: a message on the display and a light within the operator station.

4. The work vehicle of claim 2, wherein alerting the operator to reduce the travel speed of the work vehicle includes using both a visual indicator and an audio indicator to indicate that the speed of movement of the conveyor is greater than the maximum acceptable speed.

5. The work vehicle of claim 2, wherein the work vehicle is operable in a manual mode in which the operator is alerted via the user interface to reduce the travel speed of the work vehicle in response to the conveyor exceeding the maximum acceptable speed, and an automatic mode in which the travel speed of the work vehicle is automatically reduced upon the conveyor exceeding the maximum acceptable speed.

6. The work vehicle of claim 5, wherein the manual mode and the automatic mode are interchangeable during operation of the work vehicle.

7. The work vehicle of claim 2, further comprising a gate positioned above the conveyor to limit a volume flow rate of dry material from the conveyor to the blower.

8. The work vehicle of claim 7, wherein the gate can be connected to the work vehicle above the conveyor at a plurality of locations such that the volume flow rate of dry material from the conveyor to the blower can be adjusted by moving the gate with respect to the conveyor.

9. The control system of claim 1, wherein the processor is configured to
   display a first indicator while the calculated speed of movement of the conveyor is less than the maximum acceptable speed,
   display a second indicator while the calculated speed of movement of the conveyor is greater than approximately 95% of the maximum acceptable speed, and
   display a third indicator while the calculated speed of movement of the conveyor is at or above the maximum acceptable speed.

10. The control system of claim 1, wherein the control system is operable in a manual mode in which the processor is configured to alert the operator to reduce the travel speed of the work vehicle if the conveyor speed is greater than the maximum acceptable speed.

11. The control system of claim 10, wherein the processor is configured to alert the operator through at least one of the following: a visual indicator and an audio indicator.

12. The control system of claim 11, wherein the visual indicator is a message on a display within an operator station of a work vehicle, the message indicative of a current operating percentage of a calculated volumetric flow limit.

13. The control system of claim 11, wherein the visual indicator is a light within an operator station, configured such that the light is a first color while the conveyor speed is less than the maximum acceptable speed, and the light is a second color while the conveyor speed is greater than the maximum acceptable speed.

14. The control system of claim 13, wherein the light is a third color while the conveyor speed is greater than approximately 95% of the maximum acceptable speed.

15. The control system of claim 1, wherein the control system is operable in an automatic mode in which the processor is configured to communicate with the drive train to reduce the travel speed of the work vehicle if the conveyor speed is greater than the maximum acceptable speed.

16. A method of controlling a travel speed of a work vehicle, the work vehicle including a control system, a frame, a drive train connected to the frame, and a conveyor configured to move dry material from a holding tank, the method comprising:
   sensing a travel speed of the work vehicle;
   calculating a speed of movement of the conveyor based upon the sensed travel speed of the work vehicle;
   comparing the calculated speed of movement of the conveyor to a maximum acceptable speed, the maximum acceptable speed based at least in part upon a volumetric flow limit of the dry material, where the volumetric flow limit is set in a factory or determined as a function of a level of moisture in the dry material; and
   in response to the calculated speed of movement of the conveyor being greater than the maximum acceptable speed, alerting the operator to reduce the travel speed of the work vehicle or communicating with the drive train to reduce the travel speed of the work vehicle.

17. The method of claim 16, further comprising:
   operating in a manual mode; and
   alerting the operator via the control system to reduce the travel speed of the work vehicle if the conveyor speed is greater than the maximum acceptable speed.

18. The method of claim 16, further comprising:
operating in an automatic mode; and
communicating via the control system with the drive train to reduce the travel speed of the work vehicle if the conveyor speed is greater than the maximum acceptable speed.

\* \* \* \* \*